(12) United States Patent
Zhao et al.

(10) Patent No.: US 10,327,127 B2
(45) Date of Patent: Jun. 18, 2019

(54) METHOD, DEVICE, AND SYSTEM FOR DEVICE PAIRING FOR IMPROVED SAFETY AND SECURITY OF FIRST RESPONDERS ENTERING AN INCIDENT SCENE AREA

(71) Applicant: MOTOROLA SOLUTIONS, INC, Chicago, IL (US)

(72) Inventors: Kang-Kai Zhao, Chengdu (CN); Da-Jun Chen, Chengdu (CN); Xun Fei, Chengdu (CN); Wen Feng, Chengdu (CN); Ya-Hui Gong, Chengdu (CN); Yong Tian, Chengdu (CN); Dong Zhao, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/753,479

(22) PCT Filed: Dec. 22, 2015

(86) PCT No.: PCT/CN2015/098348
§ 371 (c)(1),
(2) Date: Feb. 19, 2018

(87) PCT Pub. No.: WO2017/107077
PCT Pub. Date: Jun. 29, 2017

(65) Prior Publication Data
US 2018/0288599 A1    Oct. 4, 2018

(51) Int. Cl.
*H04W 4/90* (2018.01)
*H04W 48/04* (2009.01)
(Continued)

(52) U.S. Cl.
CPC ............ *H04W 4/90* (2018.02); *G08B 27/001* (2013.01); *H04W 4/021* (2013.01); *H04W 4/023* (2013.01);
(Continued)

(58) Field of Classification Search
CPC ......... H04W 48/02; H04W 4/80; H04W 4/90; H04W 48/04
(Continued)

(56) References Cited

U.S. PATENT DOCUMENTS 7,290,141 B2    10/2007  Sengodan et al.
7,996,465 B2     8/2011  Cromp et al.
(Continued)

FOREIGN PATENT DOCUMENTS

CN            102983890 A       3/2013

OTHER PUBLICATIONS

The International Search Report and the Written Opinion, corresponding patent application No. PCT/CN2015/098348 filed Dec. 22, 2015, all pages.

*Primary Examiner* — John J Lee (57) ABSTRACT

Improved incident device pairing for safety and security of first responders entering an incident scene area associated with an incident is provided. An electronic computing device (ECD) transmits a request to scan for nearby pairable mobile computing devices to each of a plurality of mobile computing devices (MCDs) associated with the incident. The ECD receives identity information from each MCDs setting forth identities of other MCDs reachable via a short-range wireless communication link. The ECD accesses equipment mapping information that sets forth equipment associated with the MCD or user thereof and identifies a plurality of pairs of MCDs for entering the incident scene area as a function of the identity and equipment mapping (Continued)

information. The ECD then transmits a short-range pairing instruction to each MCD identifying the other mobile computing device in the pair and instructing the MCDs to pair with one another via their short-range wireless communication link.

20 Claims, 4 Drawing Sheets

(51) Int. Cl.
    *H04W 4/02*     (2018.01)
    *H04W 76/50*     (2018.01)
    *H04W 4/80*     (2018.01)
    *H04W 76/30*     (2018.01)
    *H04W 76/14*     (2018.01)
    *G08B 27/00*     (2006.01)
    *H04W 4/021*     (2018.01)
    *H04W 8/00*     (2009.01)
    *H04W 76/10*     (2018.01)
    *H04W 92/18*     (2009.01)

(52) U.S. Cl.
    CPC ............. *H04W 4/80* (2018.02); *H04W 8/005* (2013.01); *H04W 48/04* (2013.01); *H04W 76/14* (2018.02); *H04W 76/30* (2018.02); *H04W 76/50* (2018.02); *H04W 76/10* (2018.02); *H04W 92/18* (2013.01)

(58) Field of Classification Search
    USPC .......... 455/41.2, 41.3, 515, 434, 3.01, 67.11, 455/41.1
    See application file for complete search history.

(56) References Cited

U.S. PATENT DOCUMENTS

| | | |
|---|---|---|
| 2011/0021147 A1 | 1/2011 | Tout |
| 2011/0237217 A1 | 9/2011 | Monks et al. |
| 2011/0237287 A1 | 9/2011 | Klein et al. |
| 2013/0196612 A1* | 8/2013 | Cepuran ............... H04W 4/023 |
| | | 455/404.1 |
| 2013/0340002 A1 | 12/2013 | Reams et al. |
| 2014/0108083 A1 | 4/2014 | Nguyen et al. |
| 2014/0140241 A1 | 5/2014 | Ljung |
| 2014/0195654 A1* | 7/2014 | Kiukkonen ............. H04W 8/00 |
| | | 709/220 |
| 2014/0213295 A1 | 7/2014 | Conklin |
| 2016/0226845 A1* | 8/2016 | Kim ........................ H04L 9/083 |
| 2016/0234632 A1* | 8/2016 | Suumaki ............. H04M 1/7253 |

* cited by examiner

METHOD, DEVICE, AND SYSTEM FOR DEVICE PAIRING FOR IMPROVED SAFETY AND SECURITY OF FIRST RESPONDERS ENTERING AN INCIDENT SCENE AREA

This application is a National Stage filing under 35 USC § 371 of co-pending Patent Cooperation Treaty international application having Serial No. PCT/CN15/98348 (the 'PCT international application') filed on Dec. 22, 2015. This application claims priority to the PCT international application, the entire contents of which are incorporated herein by reference.

BACKGROUND OF THE INVENTION

In some communication scenarios, it is desirable to have users paired up with one another. One example scenario where such pairing is desired is in the area of Public Safety. More particularly, Public Safety officers or other types of first responders may enter hazardous situations in which the officers are paired up to provide support and aid for one another and to ensure that all officers are able to vacate an incident scene when instructed to do so. For example, in one scenario two firefighters may entire a burning building, and may be manually paired up in pairs of two in order to provide support in navigating into the building and, when necessary, when exiting the building. Similar concerns may arise with respect to other types of incident scenes.

Conventional pairing mechanisms may include a command central officer on-scene manually pairing up officers or firefighters prior to entering the incident scene. A remote dispatcher may perform a same or similar function. However, this type of ad-hoc assignment results in non-optimal pairings, difficulty in identifying who has been paired up and who hasn't, and pairings whose subsequent failure to remain in a vicinity of one another is difficult to track and report.

Thus, there exists a need for an improved method and system for initial device pairing prior to entering an incident scene area, and for continued tracking and reporting of a status of the pairing at the incident scene area.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for initial device pairing prior to entering an incident scene area, and for continued tracking and reporting of a status of the pairing at the incident scene area.

In one embodiment, a process for incident device pairing for improved safety and security of first responders entering an incident scene area associated with an incident includes: transmitting, by an electronic computing device, a request to scan for nearby pairable mobile computing devices to each of a plurality of mobile computing devices associated with the incident; receiving, by the electronic computing device from each of the plurality of mobile computing devices, identity information setting forth identities of other mobile computing devices reachable via a short-range wireless communication link; accessing, by the electronic computing device, equipment mapping information that, for each of the plurality of mobile computing devices, sets forth equipment associated with one or both of the respective mobile computing device and a user of the respective mobile computing device; identifying, by the electronic computing device, a plurality of pairs of mobile computing devices for entering the incident scene area as a function of the identity information and the equipment mapping information; and for each identified pair of mobile computing devices, transmitting, by the electronic computing device, a short-range pairing instruction to each mobile computing device in the pair identifying the other mobile computing device in the pair and instructing the mobile computing devices to pair with one another via their respective short-range wireless communication link.

In a further embodiment, an electronic computing device for incident device pairing for improved safety and security of first responders entering an incident area associated with an incident includes: one or more wireless transceivers; a data store; and one or more processors configured to: transmit, via the one or more wireless transceivers, a request to scan for nearby pairable mobile computing devices to each of a plurality of mobile computing devices associated with the incident; receive, via the one or more wireless transceivers from each of the plurality of mobile computing devices, identity information setting forth identities of other mobile computing devices reachable via a short-range wireless communication link; access, via the data store, equipment mapping information that, for each of the plurality of mobile computing devices, sets forth equipment associated with one or both of the respective mobile computing device and a user of the respective mobile computing device; identify a plurality of pairs of mobile computing devices for entering the incident scene area as a function of the identity information and the equipment mapping information; and for each identified pair of mobile computing devices, transmit via the one or more wireless transceivers, a short-range pairing instruction to each mobile computing device in the pair identifying the other mobile computing device in the pair and instructing the mobile computing devices to pair with one another via their respective short-range wireless communication link.

In a still further embodiment, a non-transitory computer readable medium containing a set of instructions that, in response to execution by a processor of an electronic computing device, performs a set of functions including: transmitting, by the electronic computing device, a request to scan for nearby pairable mobile computing devices to each of a plurality of mobile computing devices associated with the incident; receiving, by the electronic computing device from each of the plurality of mobile computing devices, identity information setting forth identities of other mobile computing devices reachable via a short-range wireless communication link; accessing, by the electronic computing device, equipment mapping information that, for each of the plurality of mobile computing devices, sets forth equipment associated with one or both of the respective mobile computing device and a user of the respective mobile computing device; identifying, by the electronic computing device, a plurality of pairs of mobile computing devices for entering the incident scene area as a function of the identity information and the equipment mapping information; and for each identified pair of mobile computing devices, transmitting, by the electronic computing device, a short-range pairing instruction to each mobile computing device in the pair identifying the other mobile computing device in the pair and instructing the mobile computing devices to pair with one another via their respective short-range wireless communication link.

Each of the above-mentioned embodiments will be discussed in more detail below, starting with example system and device architectures in which the embodiments may be practiced, followed by an illustration of processing steps and message transmissions and/or receptions for improved initial device pairing prior to entering an incident scene area, and for continued tracking and reporting of a status of the pairing at the incident scene area, from an electronic computing device perspective. Further advantages and features consistent with this disclosure will be set forth in the following detailed description, with reference to the figures.

1. SYSTEM ARCHITECTURE AND DEVICE STRUCTURES

Figure 1:
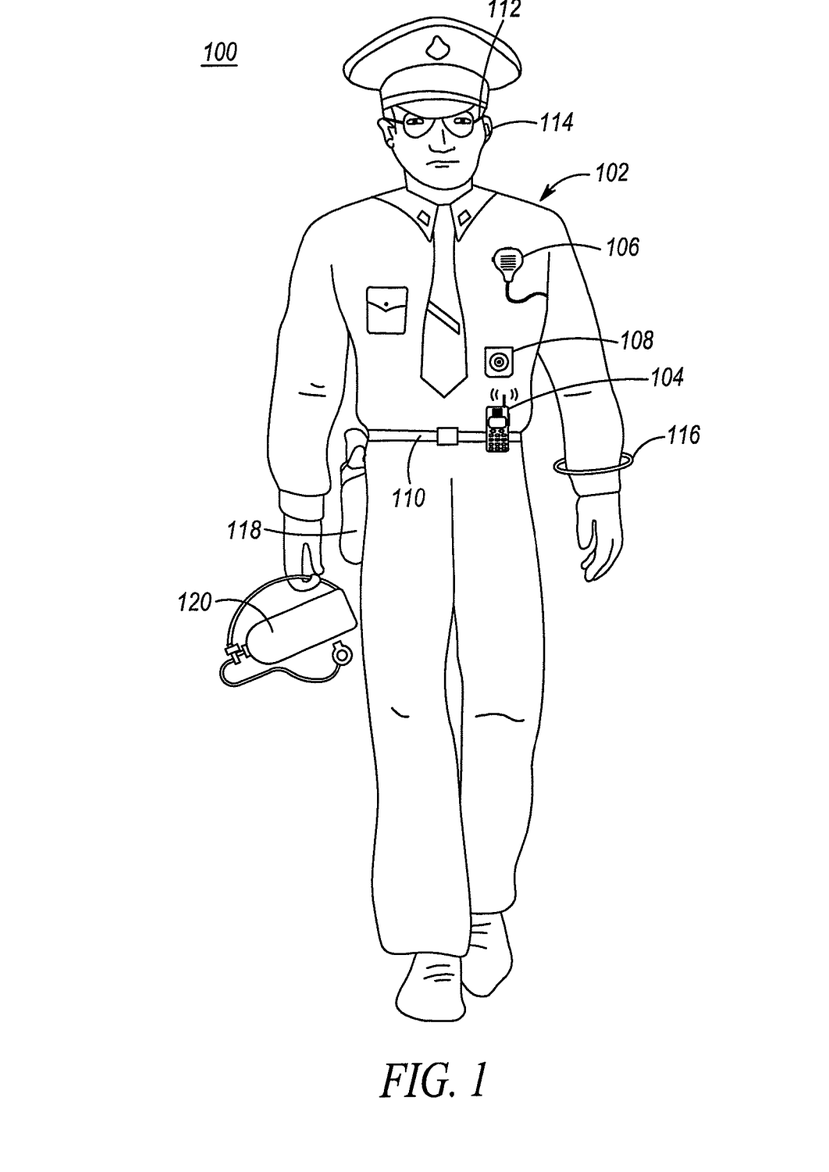
FIG. 1 is a system diagram illustrating a user such as an officer wearing a plurality of equipment and a mobile computing device that implements improved device pairing for entering an incident scene area, in accordance with some embodiments.

Referring now to the drawings, and in particular FIG. 1, a system diagram illustrates a system 100 of devices that a user 102 (such as an officer or other person) may wear, including a primary mobile computing device 104, which in this example is a mobile radio used for narrowband and/or broadband communications, and a plurality of pieces of equipment, which in this example includes a remote speaker microphone (RSM) 106, a video camera 108, a biometric sensor device 110, a pair of smart glasses 112, an earpiece 114, an activity tracker 116, a weapon status detector 118, and an air tank 120 (e.g., such as an oxygen tank).

The mobile computing device 104 may be any wireless device used for infrastructure-supported or direct mode media (e.g., voice, audio, video, etc.) communication via a long-range transmitter (e.g., in comparison to a short-range transmitter such as a Bluetooth, IEEE 802.11 Wi-Fi, Zigbee, IrDA, or NFC transmitter) and/or transceiver with other mobile computing devices or infrastructure devices. The long-range transmitter may have a transmit range on the order of miles, e.g., 0.5-50 miles, or 1-10 miles (or a similar range in meters).

Infrastructure-supported long-range wireless communications may be made via radio access networks (RANs) that provide for radio communication links to be arranged within the network between a plurality of mobile computing devices. Such mobile computing devices may also be known as 'mobile stations' or 'subscriber devices.' At least one other terminal, e.g. used in conjunction with mobile computing devices, may be a fixed terminal, e.g. a base station, eNodeB, repeater, and/or access point. Such a RAN typically includes a system infrastructure which generally includes a network of various fixed terminals that are in direct radio communication with the mobile computing devices. Each of the fixed terminals operating in the RAN may have one or more transceivers that may, for example, serve mobile computing devices in a given region or area, known as a 'cell' or 'site', by radio frequency (RF) communication. The mobile computing devices that are in direct communication with a particular fixed terminal are said to be served by the fixed terminal. In one example, all radio communications to and from each mobile computing device within the RAN are made via respective serving fixed terminals. Sites of neighboring fixed terminals may be offset from one another and may be non-overlapping or partially or fully overlapping with one another.

RANs may operate according to an industry standard land mobile radio (LMR) protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. RANs may additionally or alternatively operate according to an industry standard broadband protocol such as, for example, the Long Term Evolution (LTE) protocol including multimedia broadcast multicast services (MBMS), the open mobile alliance (OMA) push to talk (PTT) over cellular (OMA-PoC) standard, the voice over IP (VoIP) standard, or the PTT over IP (PoIP) standard, among many other possibilities. Because the LMR systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocol. Mobile computing devices in RANs such as those set forth above send and receive media streams (encoded portions of voice, audio, and/or audio/video streams) in a call in accordance with the designated protocol.

Individual (e.g., one to one) or group (e.g., one to many) calls may be made between wireless and/or wireline participants in accordance with the narrowband or broadband protocol or standard. Group members for group calls may be statically or dynamically defined. That is, in a first example, a user or administrator working on behalf of the user may indicate to the switching and/or radio network (perhaps at a controller device, such as a call controller, PTT server, serving gateway, radio network controller (RNC), zone controller, or mobile management entity (MME), base station controller (BSC), mobile switching center (MSC), site controller, Push-to-Talk controller, or other network device) a list of participants of a group at the time of the call or in advance of the call. The group members (e.g., mobile computing devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile computing devices may dynamically affiliate with a group (and also disassociate with the group) perhaps based on user input, and the switching and/or radio network may track group membership and route new group calls according to the current group membership.

Although in the example of FIG. 1 a mobile computing device including a long-range transmitter is used as an example primary mobile computing device, in other embodiments, other types of mobile computing devices may be used, with or without a long-range transmitter, including but not limited to, a tablet computer, a laptop computer, and a mobile phone device that provides individual or group-communication services over a short-range wireless communications link, such as but not limited to IEEE 802.11 Wi-Fi or Bluetooth.

In the example of FIG. 1, the mobile computing device 104 forms the hub of communication connectivity for the officer, through which wireless-capable pieces of equipment, such as the wireless accessory devices 106-118, may communicate. In order to communicate with such wireless access devices, the mobile computing device 104 additionally or alternatively contains a short-range transmitter (e.g., in comparison to the long-range transmitter such as a LMR or Broadband transmitter or in addition to another short-range transmitter) and/or transceiver. The short-range transmitter may be a Bluetooth or IEEE 802.11 Wi-Fi transmitter having a transmit range on the order of 0.01-100 meters, or 0.1-10 meters.

Wireless accessory devices 106-118 communicate with the mobile computing device 104 via their own short-range transmitter and/or transceivers, and provide specialized function extensions to the mobile computing device 104. For example, the RSM 106 may act as a remote microphone that the user 102 may access more easily and is better positioned near the user's 102 mouth. Audio and/or voice received at the RSM 106 may be provided to the mobile computing device 104 for further transmission via its long-range transmitter or secondary short-range transmitter to other users. A speaker may also be provided in the RSM 106 unit such that audio and/or voice received at the mobile computing device 104 is transmitted to the RSM 106 and reproduced closer to the user's 102 ear.

The video camera 204 may be an always-on device or an activated-on-demand video capture device that provides video and/or audio to the mobile computing device 104 for storage at the mobile computing device 104 or for further transmission to a dispatch center or to other mobile computing device users via the mobile computing device's 104 long-range-transmitter. The video may include visible light imaging and/or infra-red imaging.

The biometric sensor device 110 may be a device capable of sensing biometric data of its wearer, such as heart rate, body temperature, etc. Additionally or alternatively, an environmental sensor may be provided to detect environmental parameters such as oxygen levels, environmental temperature levels, environmental radiation levels, etc. The biometric sensor device 110 provides measured parameter information to the mobile computing device 104 for storage and/or analysis at the mobile computing device 104 and/or for further transmission to a dispatch center or to other users via the mobile computing device's long-range-transmitter.

The smart glasses 112 may maintain a bi-directional connection with the mobile computing device 104 and provide an always-on or on-demand video feed pointed in a direction of the officer's gaze, and/or may provide a personal display via a projection mechanism integrated into the smart glasses 112 for displaying information such as text, images, or video received from the mobile computing device 104. In some embodiments, an additional user interface mechanism such as a touch interface may be provided on the smart glasses 112 that allows the user 102 to interact with the display elements displayed on the smart glasses 112.

The earpiece 114 may maintain an audio connection with the mobile computing device 104 and provide the user 102 the ability to discretely hear private or group communications received at the mobile computing device 104 from other mobile computing devices or from an infrastructure device, and which may be provided to the earpiece 114 for private reproduction to the user 102.

The activity tracking device 116 may be an electronic device for tracking an activity of the user 102, and may include one or more movement sensors (such as an accelerometer, magnetometer, and/or gyroscope) that may periodically or intermittently provide to the mobile computing device 104 indications of orientation, direction, steps, acceleration, and/or speed, perhaps accompanying other information. An accelerometer is a device that measures acceleration. Single and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used as well. Although the mobility tracker 116 is shown in FIG. 1 as a bracelet worn around the wrist, in other examples, the mobility tracker 116 may be worn around another part of the body, or may take a different physical form including an earring, a finger ring, a necklace, or some other type of wearable form factor.

The weapon status sensor 118 may maintain state information regarding a weapon normally holstered within the user's 102 weapon holster. The weapon status sensor may detect a current state (presence, absence), a change in state (presence to absence or vice versa), and/or an action (removal) relative to a weapon normally holstered within the holster to which the sensor is coupled. The detected state, change in state, and/or action may be reported to the mobile computing device 104 via its short-range transceiver. In some embodiments, the weapon status sensor 118 may also detect whether the first responder's hand is resting on the weapon even if it has not yet been removed from the holster and provide such information to mobile computing device 104. Other possibilities exist as well.

In addition to the wireless accessory devices 106-118 that communicate with the mobile computing device 104 via their own short-range transmitter and/or transceivers and provide specialized function extensions to the mobile computing device 104, the user 102 may be equipped with other equipment that does not directly interface with, or have the capability to interface with, the mobile computing device 104. For example, the user 102 may be equipped with an air tank 120 that may provide an emergency source of oxygen to the user 102 once the user 102 enters an incident scene area. In cases such as an air tank 102 that cannot electronically register with and/or communicate with mobile computing device 104, the user 102 may manually enter (e.g., via a keypad, touch screen, voice command input, image capture and recognition, gesture, or other type of input mechanism) the existence of the equipment via a user interface of the mobile computing device 104. Other type of equipment available to the user 102 may be identified in a similar manner, including but not limited to a K-9 unit, a personal drone unit, and a tactical robotic unit. Other examples are possible as well.

Figure 2:
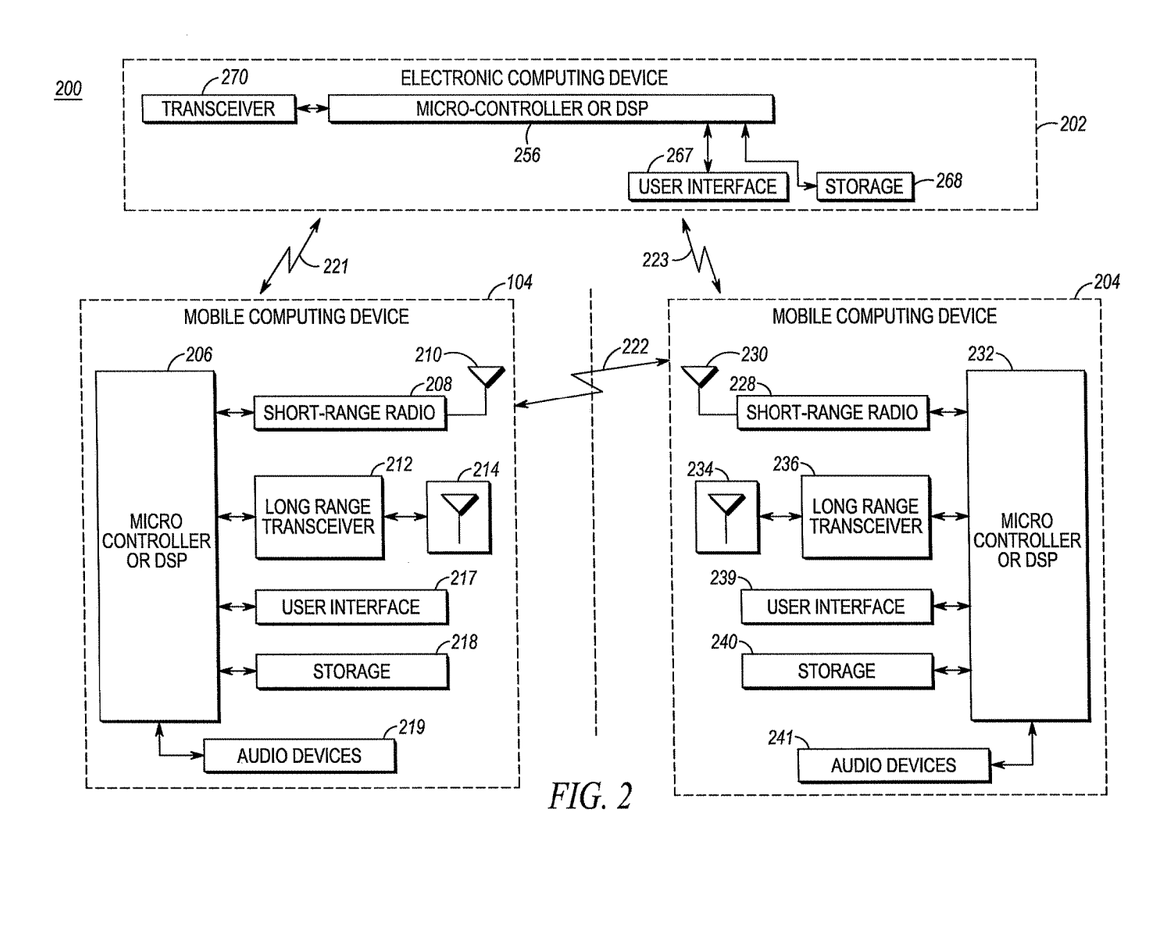
FIG. 2 is a pictorial diagram showing device structures and wireless interfaces between an electronic computing device and a plurality of mobile computing devices to be paired, in accordance with some embodiments.

FIG. 2 provides a detailed block diagram of how the major components of a system 200, including the first mobile computing device 104, a second mobile computing device 204, and an electronic computing device 202 are structured and how they interface with one another. While only first and second mobile computing devices 104, 204 forming a single pair of mobile computing devices are shown in FIG. 2 for ease of illustration, other embodiments may include multiple pairs of mobile computing devices having same or similar structures to that illustrated in FIG. 2.

Figure 3:
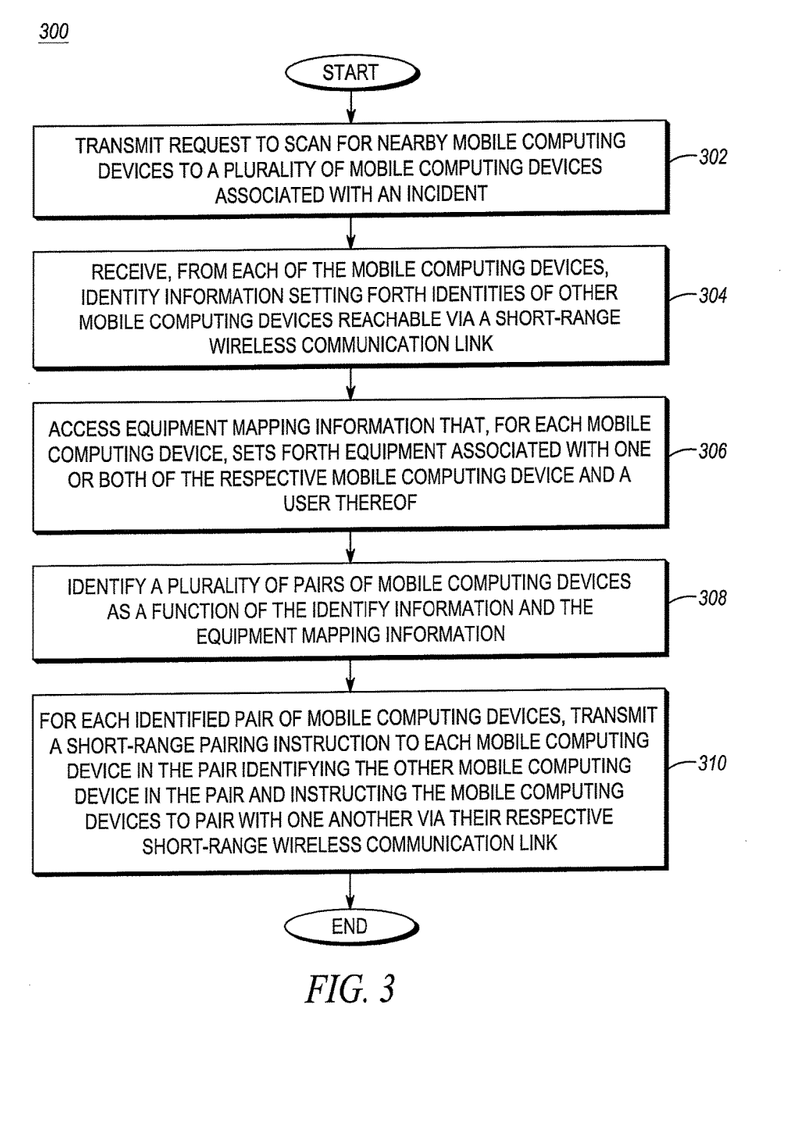
FIG. 3 illustrates a flow chart showing transmissions, receptions, and process steps for improved device pairing for entering an incident scene area, in accordance with some embodiments.

The first mobile computing device 104 comprises: a microcontroller or digital signal processor (DSP) 206; a short-range wireless radio 208 with a corresponding antenna 210 for communicating with other mobile computing devices such as mobile computing device 204 via a short-range link 222 (which may include a Bluetooth radio 208 and Bluetooth link 222, an NFC radio 208 and NFC link 222, an IEEE 802.11 Wi-Fi radio 208 and IEEE 802.11 Wi-Fi link 222, or an IrDA transmitter 208 and IrDA link 222, among other possibilities); a long-range narrowband (NB) or broadband (BB) radio 212 and corresponding antenna 214 for communicating in a direct-mode or infrastructure mode with other mobile computing devices and/or the electronic computing device 202 via a long-range link 221; a user interface 217 (which may include a display and/or LEDs, a touch input interface, a mechanical input interface, and/or one or more buttons or switches, among other possibilities); a computer readable storage 218 (which may store computer readable instructions that, when executed by the microcontroller 206, perform one or more of the transmitting, receiving, and/or processing steps set forth in FIG. 3 and/or may store physical state information describing a particular physical state of the first mobile computing device 104); and audio devices 219 (which may include a speaker for providing output audio to a user and a microphone for capturing user audio input and providing it to the first mobile computing device 104). Additional electronic circuits may be added providing additional feature sets as well. For example, in some embodiments, the first mobile computing device 104 may include a second short-range wireless radio (selected from those listed above) different from the first short-range wireless radio 208 for interfacing with one or more of the wireless accessory devices 106-118 of FIG. 1. In still other embodiments, the first mobile computing device 104 may use the same first short-range wireless radio 208 used to interface with other mobile computing devices such as mobile computing device 204 to interface with the one or more wireless accessory devices 106-118. Other possibilities exist as well.

The long-range NB or BB radio 212 may operate according to an industry standard LMR protocol such as, for example, the P25 standard defined by the APCO, the TETRA standard defined by the ETSI, the dPMR standard also defined by the ETSI, or the DMR standard also defined by the ETSI. The long-range NB or BB radio 212 may additionally or alternatively operate according to an industry standard broadband protocol such as, for example, the LTE protocol including MBMS, the OMA-PoC standard, the VoIP standard, or the PoIP standard, among many other possibilities.

The second mobile computing device 204 comprises: a microcontroller or DSP 232; a short-range wireless radio 228 with a corresponding antenna 230 for communicating with mobile computing device 104 via the short-range link 222 (which may include a Bluetooth radio 228 and Bluetooth link 222, an NFC radio 228 and NFC link 222, an IEEE 802.11 Wi-Fi radio 228 and IEEE 802.11 Wi-Fi link 222, or an IrDA transmitter 228 and IrDA link 222, among other possibilities); a long-range NB or BB radio 236 and corresponding antenna 234 for communicating in a direct-mode or infrastructure mode with other mobile computing devices and/or the electronic computing device 202 via a long-range link 223; a user interface 239 (which may include a display and/or LEDs, a touch input interface, a mechanical input interface, and/or one or more buttons or switches, among other possibilities); a computer readable storage 240 (which may store computer readable instructions that, when executed by the microcontroller 206, perform one or more of the transmitting, receiving, and/or processing steps set forth in FIG. 3 and/or may store physical state information describing a particular physical state of the second mobile computing device 204); and audio devices 241 (which may include a speaker for providing output audio to a user and a microphone for capturing user input and providing it to the second mobile computing device 204). Additional electronic circuits may be added providing additional feature sets as well. For example, in some embodiments, the second mobile computing device 204 may include a second short-range wireless radio (selected from those listed above) different from the first short-range wireless radio 228 for interfacing with one or more wireless accessory devices same or similar to the wireless accessory devices 106-118 of FIG. 1. In still other embodiments, the second mobile computing device 204 may use the same first short-range wireless radio 228 used to interface with other mobile computing devices such as mobile computing device 104 to interface with the one or more wireless accessory devices 106-118. Other possibilities exist as well. The long-range NB or BB radio 236 may operate in a manner same or similar to the long-range NB or BB radio 212.

Electronic computing device 202 comprises: a microcontroller or DSP 256; a transceiver 270; a user interface 267 (which may include a display and/or LEDs, a touch input interface, a mechanical input interface, and/or one or more buttons or switches, among other possibilities); and a computer readable storage 268 (which may store computer readable instructions that, when executed by the microcontroller 256, perform one or more of the transmitting, receiving, and/or processing steps set forth in FIG. 3, may store equipment mapping information that, for each of the plurality of mobile computing devices, sets forth equipment associated with one or both of the respective mobile computing device and a user of the respective mobile computing device, pairing information identifying which mobile computing devices are paired with which other mobile computing devices, and/or pairing status information indicating a current pairing status of the paired mobile computing devices, among other information).

The transceiver 270 may be a wireless or wired transceiver that communicatively couples the electronic computing device 202 with mobile computing devices including first and second mobile computing devices 104, 204. For example, the transceiver 270 may be a wireless transceiver that communicatively couples directly or indirectly with mobile computing devices and may operate according to an industry standard LMR protocol such as, for example, the P25 standard defined by the APCO, the TETRA standard defined by the ETSI, the dPMR standard also defined by the ETSI, or the DMR standard also defined by the ETSI. The transceiver 270 may additionally or alternatively operate according to an industry standard broadband protocol such as, for example, the LTE protocol including MBMS, the OMA-PoC standard, the VoIP standard, or PoIP standard, among many other possibilities. In still further examples, the transceiver 270 may additionally or alternatively include a wired transceiver that communicatively couples indirectly with mobile computing devices via a base station, repeater, or other fixed equipment station that itself wirelessly couples with the mobile computing devices. The wired transceiver may be, for example, an Ethernet transceiver, a Universal Serial Bus (USB) transceiver, or similar transceiver configurable to communicate via a twisted pair wire, a coaxial cable, a fiber-optic link, or a similar physical connection to a wireline network. Other possibilities exist as well.

2. PROCESSES FOR IMPROVING INITIAL DEVICE PAIRING

Turning now to FIG. 3, a flowchart illustrates a method 300 for improving initial device pairing of mobile computing devices prior to entering an incident scene area. Method 300 is executed at an electronic computing device 202 that is communicably coupled to two or more mobile computing devices 104, 204. The electronic computing device may be a command central computing device disposed at the incident scene, may be a commanding officer's mobile computing device at the incident scene, or may be an infrastructure computing dispatch console device located within a wireless infrastructure or public safety infrastructure network, among other possibilities.

Method 300 begins when a user of the electronic computing device initiates a pairing-up process for pairing up mobile computing devices at or near an incident scene area prior to the mobile computing devices entering the incident scene, such as entering a physical structure or defined geographic incident scene area. The electronic computing device may initiate the pairing-up process in response to a user, such as a commanding officer or dispatcher, activating an input switch, button, or touch screen area associated with initiating the pairing-up process. In other examples, the pairing-up process may be initiated automatically responsive to the electronic computing device determining its location, via a global positioning system (GPS) or triangulation process, is at or near an incident scene area whose location was previously provided to (over-the-air) or entered into (manually) the electronic computing device.

In response to detecting initiation of the pairing-up process, the electronic computing device transmits a request to mobile computing devices in a vicinity of the incident scene area to scan for nearby mobile computing devices. The request may be a broadcast to a talkgroup of mobile computing devices or on a channel known to be associated with the incident and monitored by the mobile computing devices, or may be a broadcast, multicast, or multiple unicast transmitted to two or more mobile computing devices known to be associated with the incident (e.g., known to be dispatched to the incident). The request may be transmitted directly to the mobile computing devices from the electronic computing device, or may be transmitted via one or more intervening wired or wireless networking devices, such as but not limited to a base station, repeater, or other fixed infrastructure.

The request to scan for nearby mobile devices is received at each mobile computing device via a respective long-range transceiver, such as transceivers 212 and 236 of FIG. 2. In response to receiving the request, the mobile computing devices each initiate a scan for nearby mobile computing devices using a short-range radio (e.g., a different transceiver than that over which the request was received) such as short-range radios 208 and 228 of FIG. 2. The discovery process may be conducted in a number of different ways depending on the particular short-range protocol implemented at the mobile computing devices. For example, for mobile computing devices implementing the Bluetooth short-range protocol, an inquiry message may be transmitted after which the devices transition to a monitoring mode to listen for other mobile computing devices responding to the inquiry message. For mobile computing devices implementing the IEEE 802.11 short-range protocol, the mobile computing devices may alternate operating in an infrastructure mode and transmitting periodic beacons and transitioning to a monitoring mode to detect beacons transmitted by other mobile communication devices operating in an infrastructure mode. Other short-range protocols may operate same or similar discovery mechanisms. Regardless of which short-range protocol is implemented, each mobile computing device monitors for nearby other mobile computing devices, and builds a list of identities of other mobile computing devices it detects via its short-range radio. The identities may comprise, for example, Bluetooth addresses, media access control (MAC) addresses, service set identifiers (SSIDs), or other unique identifiers detected using the short-range radios. After populating their respective lists, the mobile computing devices transmit them back to the electronic computing device using their long-range transceivers.

At step 304 of FIG. 3, the electronic computing device receives, from each of the mobile computing devices, identity information setting forth identities of other mobile computing devices reachable via a short-range wireless communication link. Using this information, the electronic computing device can determine which devices are "pairable" with one another via their short-range transceivers and a short-range wireless communication link.

At step 306, the electronic computing device accesses equipment mapping information that, for each mobile computing device, sets forth equipment associated with one or both of the respective mobile computing device and a user thereof. The equipment mapping information may be stored at the electronic computing device or made accessible to the electronic computing device via its transceiver. The equipment mapping information may be pre-populated prior to the incident, or may be dynamically populated using equipment information provided from each mobile computing device. More specifically, the electronic computing device may request equipment information, or each mobile computing device may provide equipment information responsive to receiving the scan request of step 302, setting forth currently equipped or available equipment at the respective mobile computing device. As set forth above, the equipment information stored at each mobile computing device and provided to the electronic computing device in this manner may be determined via a secondary short-range communication link with a plurality of wireless accessory devices such as those 106-118 set forth in FIG. 1, or may be determined via data entry, optical recognition, or voice command, among other possibilities.

TABLE I

| Index | ID: | Available Equipment: |
|---|---|---|
| 1 | 0xEF01 | RSM, VideoCamera, heat sensor |
| 2 | 0xABCD | oxygen tank, weapon, heat sensor |
| 3 | 0x1234 | K9, weapon |
| 4 | 0x6789 | oxygen tank, personal drone |

As set forth in Table I above, equipment mapping information may set forth a mapping between one of a user or a device, and for each user or device, set forth equipment associated with the user or device. In this example, a first user or device having an identifier 0xEF01 is associated with available equipped equipment including an RSM, a Video Camera, and a heat sensor, as set forth in Table 1. A second user or device having an identifier 0xABCD is associated with available equipped equipment including an oxygen tank, a weapon, and a K9 unit. A third user or device having an identifier 0x1234 is associated with available equipped equipment including a heat sensor and a weapon. A fourth user or device having an identifier 0x6789 is associated with available equipped equipment including an oxygen tank and a personal drone.

At step 308, the electronic computing device identifies a plurality of pairs of mobile computing devices for entering the incident scene area as a function of the identity information received at step 304 and the equipment mapping information received at step 306. For example, the electronic computing device may apply one or more incident scene pairing rules, entered by an incident commander at the electronic computing device or applied as a function of a determined or identified type of incident occurring at the incident scene area, and apply the incident scene pairing rules to the identity information received at step 304 and the equipment mapping information received at step 306 to arrive at a set of pairings of all mobile computing devices that satisfy the incident scene pairing rules. If the incident scene pairing rules cannot be satisfied for all of the mobile computing devices associated with the incident, a notification may be raised at the electronic computing device or caused to be raised elsewhere indicating that the incident scene pairing rules cannot be satisfied for all of the mobile computing devices associated with the incident, and perhaps requesting that one or more incident scene pairing rules be relaxed or eliminated. In one example, the electronic computing device may identify the minimum number of rules and the identity of those minimum number of rules that must be eliminated in order to pair each mobile computing device at the incident scene area with at least one other mobile computing device.

For example, and using the mobile computing device IDs set forth in Table I and associated equipment mapping information set forth in Table I, a particular incident scene pairing rule for a firefighting incident may require that each pair of mobile computing devices include at least one oxygen tank. As a result, and by applying the incident scene pairing rule to the identity information received at step 304 and the equipment mapping information received at step 306 as reflected in this example in Table I, the electronic computing device may identify the first and second mobile computing devices (IDs 0xEF01 and 0xABCD) as a first pair for entering the incident scene area and the third and fourth mobile computing devices (IDs 0x1234 and 0x6789) as a second pair for entering the incident scene area. In a further example for a same incident type and using the same information from Table I, where the incident scene pairing rule requires that each pair of mobile computing devices includes a heat sensor, the electronic computing device may identify the first and third mobile computing devices (IDs 0xEF01 and 0x1234) as a first pair for entering the incident scene area and the second and fourth mobile computing devices (IDs 0xABCD and 0x6789) as a second pair for entering the incident scene area. In a still further example where the incident scene pairing rules require that each pair of mobile computing devices includes both a heat sensor and a supporting "partner" (e.g., K9 or drone), the electronic computing device may identify the first and fourth mobile computing devices (IDs 0xEF01 and 0x6789) as a first pair for entering the incident scene area and the second and third mobile computing devices (IDs 0xABCD and 0x1234) as a second pair for entering the incident scene area. Other incident scene pairing rules may be applied for other types of incidents, such as an incident scene pairing rule requiring each pair to have a weapon or a particular type of weapon for a police raid, burglary, or armed robbery incident type; an incident scene pairing rule requiring each pair to have a K9 partner aid for a drug bust incident type; an incident scene pairing rule requiring each pair to have a visible light imaging device for a traffic stop or domestic disturbance incident type; and an incident scene pairing rule requiring each pair to have robotic assistant for a search and rescue incident type. Other pairing rules could be applied as well for same, similar, or different incident types.

At step 310, and for each identified pair of mobile computing devices, the electronic computing device transmits a short-range pairing instruction to each mobile device in the pair identifying the other mobile device in the pair (e.g., using its short-range mobile computing device identifier which may be the same or different than a long-range mobile computing device identifier used to communicate with the electronic computing device), and instructing the mobile devices in each pair to pair with one another via their respective short-range wireless communication link. At step 310, the electronic computing device may also store an indication of the pairings (e.g., identifying each paired set of devices by one or both of short-range mobile computing device identifier and long-range mobile computing device identifier) so that it may continue to monitor and/or track a status of the short-range pairings, and take further action as set for the below in FIG. 4 and its accompanying description.

3. PROCESSES FOR IMPROVING PAIRED DEVICE STATUS MONITORING

Figure 4:
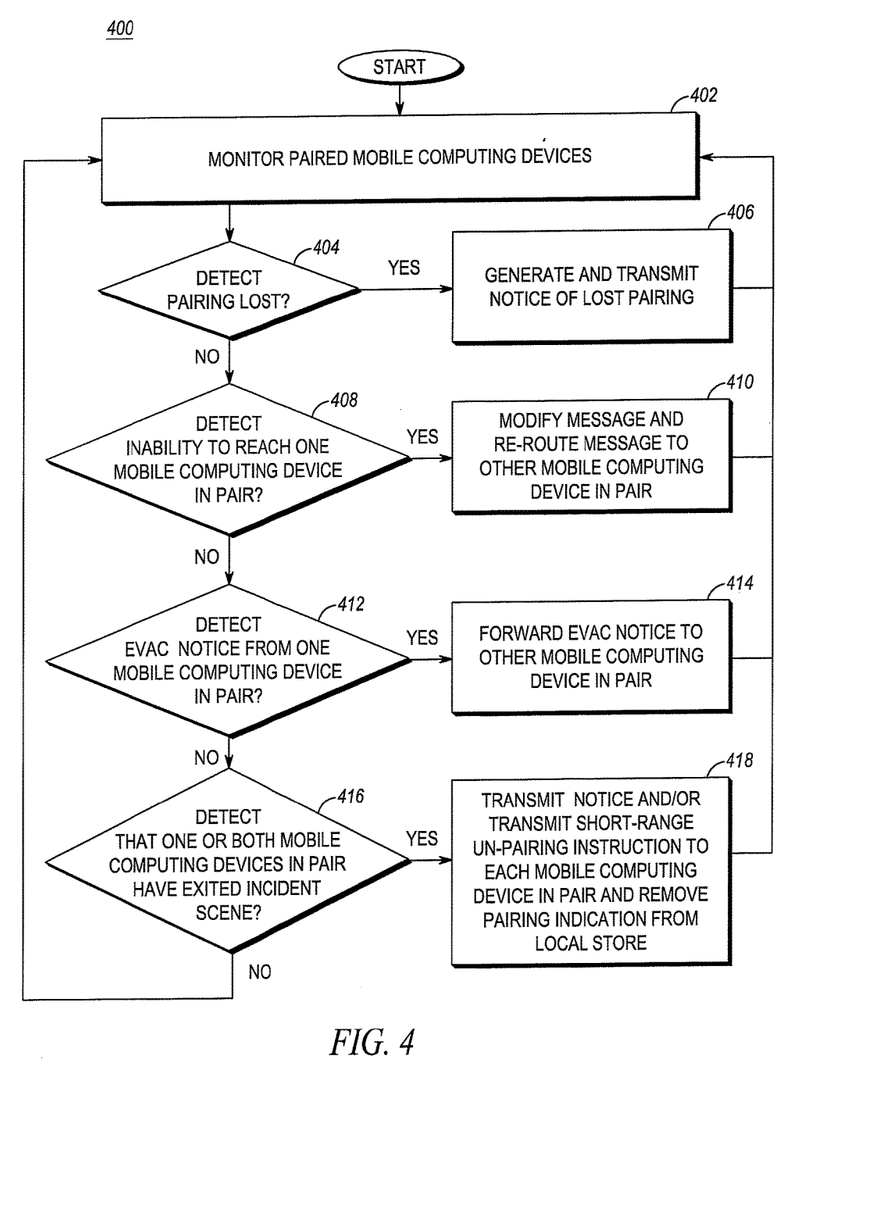
FIG. 4 illustrates a flow chart showing transmissions, receptions, and process steps for improved monitoring and/or tracking a status of short-range pairings established in FIG. 3, in accordance with some embodiments.

Turning now to FIG. 4, a flow-chart illustrates a method 400 for monitoring and/or tracking a status of short-range pairings as established in FIG. 3 and its accompanying description. Method 400 is executed at an electronic computing device 202 that is communicably coupled to two or more sets of paired mobile computing devices 104, 204. As set forth above, the electronic computing device may be a command central computing device disposed at the incident scene, may be a commanding officer's mobile computing device at the incident scene, or may be an infrastructure computing dispatch console device located within a wireless infrastructure or public safety infrastructure network.

Method 400 begins with the electronic computing device monitoring paired mobile computing device status at step 402. Monitoring paired mobile computing device status includes receiving and processing mobile computing device pairing status updates received directly or indirectly from one or both of each mobile computing device in each pair of mobile computing devices.

At step 404, the electronic computing device determines if any messages or updates received at step 402 from paired mobile computing devices indicate that the short-range pairing instructed to be established at step 310 of FIG. 3 has been lost. For example, the short-range pairing could be lost if one of the mobile computing devices in the pair loses power, suffers a catastrophic physical or electronic failure, or goes out of range of the other mobile computing device in the pair for a minimum threshold period of time. If the electronic computing device determines at step 404 that one of the paired mobile computing devices has lost its pairing, processing proceeds to step 406 where the electronic computing device generates and transmits a notice of a lost pairing connection to one or more of the on-scene command central post, the on-scene commander's mobile computing device, and the infrastructure-based dispatch console, among other possibilities. With the aid of the notification of the lost pairing connection, the user or device receiving the notice of lost pairing connection notification can follow-up with the other mobile computing device (and its user) in the pair and determine the reasoning for the lost pairing, and perhaps instruct one or both of the mobile computing devices (and their users) to reposition themselves to re-establish short-range pairing.

If, on the other hand, it is determined at step 404 that no short-range pairings have been lost, processing proceeds to step 408 where the electronic computing device may determine whether it has lost the ability to transmit messages (directly or indirectly) to one of the mobile computing devices in each pair. The electronic computing device may make the determination at step 408 as a result of a failure to transmit (or failure to receive an acknowledgment of) a particular message to one of the mobile computing devices in a pair, or as a result of a periodic beacon or heartbeat message to each mobile computing device in each pair and in response to a failure of one of the mobile computing devices to provide an acknowledgment or response to the beacon or heartbeat message. If the electronic computing device determines that it is unable to reach one of the mobile computing devices in a particular pair of mobile computing devices, processing proceeds to step 410 where it modifies a routing table to route future messages to the one of the mobile computing devices that can no longer be reached to the other mobile computing device in the pair that still can be reached. Future messages sent to the mobile computing device that can no longer be reached may be modified at the electronic computing device to be routed instead to the other mobile computing device in the pair that can be reached, and modified to include an indication that the message is intended to a user of the mobile computing device in the pair that cannot be reached.

If, on the other hand, it is determined at step 408 that each mobile computing device in each pair can still be reached, processing proceeds to step 412, where the electronic computing device may determine whether an evacuation notice has been received from one mobile computing device in each pair of mobile computing devices. If an evacuation notice is determined to have been received from one mobile computing device in a particular pair of mobile computing devices, processing proceeds to step 414, where the electronic computing device forwards the evacuation notice to the other mobile computing device in the particular pair of mobile computing devices, perhaps among other pairs of mobile computing devices. While the other mobile computing device in the particular pair of mobile computing devices may have already received the evacuation notice via its short-range communication link with the evacuation transmitting mobile computing device, the forwarding at step 414 ensures that the other mobile computing device has received the notice as long as it has maintained a communication link with the electronic computing device.

If, on the other hand, it is determined at step 412 that no evacuation notice has been received from any paired mobile computing device, processing proceeds to step 416, where the electronic computing device may determine whether one or both mobile computing devices in a pair of mobile computing devices established at step 310 has exited the incident scene area. The electronic computing device may determine that one or both mobile computing devices in each pair of mobile computing devices has exited the incident scene area in a number of ways. For example, each paired mobile computing device in a particular pair of mobile computing devices may detect that it has exited the incident scene area based on its own determined location relative to a locally stored incident scene area geographic definition or based on a received UI/UX activation by a user associated with an indicated exit from the incident scene area, and may transmit a notice of such exit to the electronic computing device. In other embodiments, each mobile computing device in a particular pair of mobile computing devices may transmit its location periodically and the electronic computing device may determine, based on reported locations and a locally stored incident scene area geographic definition, that one or both mobile computing devices have exited the incident scene area. Still further, wireless infrastructure devices such as base stations may be used to triangulate locations of each mobile computing device in a particular pair of mobile computing devices, the infrastructure-determined locations of which are provided to the electronic computing device, which can determine, based on their provided locations and a locally stored incident scene area geographic definition, that one or both mobile computing devices have exited the incident scene area. Other possibilities for determining an incident scene exit exist as well.

If, at step 418, only one of the paired mobile communications devices is determined to have exited the incident scene area, and perhaps after waiting a threshold period of time such as 10-120 or 30-60 seconds after determining that only one has exited, the electronic computing device may transmit a notice that only a single mobile communication device has exited the incident scene area to one or more of the on-scene command central post, the on-scene commander's mobile computing device, and the infrastructure-based dispatch console. With the aid of the notification of a lack of paired-exit, the user or device receiving the notice of lack of paired-exit can follow-up with the other mobile computing device (and its user) in the pair and determine the reason for the lack of paired-exit, and perhaps instruct one or both of the mobile computing devices (and their users) to exit or re-enter the incident scene area accordingly.

If, on the other hand at step 418, both of the paired mobile communications devices are determined to have exited the incident scene area, perhaps at the same time or while waiting a threshold period of time such as 10-120 or 30-60 seconds after determining that only one has exited, the electronic computing device may transmit a notice that both mobile communication devices have exited the incident scene area to one or more of the on-scene command central post, the on-scene commander's mobile computing device, and the infrastructure-based dispatch console. Additionally or alternatively, the electronic computing device may transmit a short-range un-pairing instruction to each mobile computing device in the pair of exited mobile computing devices instructing them to release the short-range pairing established via their short-range communication link. The electronic computing device may also remove the stored pairing indication of the two mobile computing devices set at step 310 of FIG. 3, preventing any further actions to be taken based on the (now released) pairing.

Although a particular order is shown in FIG. 4 between decision steps 404, 408, 412, and 416 for ease of illustration, in other embodiments the order may be changed, and in one embodiment, one or more of the determinations set forth in FIG. 4 may be executed in parallel with the other(s).

4. CONCLUSION

In accordance with the foregoing, an improved method, device, and system for initial device pairing prior to entering an incident scene area, and for continued tracking and reporting of a status of the pairing at the incident scene area, is provided. As a result of the foregoing, safety of first responders entering incident areas may be improved, and ability to further track and report upon status of the paired first responders may be improved as well. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for incident device pairing for improved safety and security of first responders entering an incident scene area associated with an incident, the method comprising:

transmitting, by an electronic computing device, a request to scan for nearby pairable mobile computing devices to each of a plurality of mobile computing devices associated with the incident;

receiving, by the electronic computing device from each of the plurality of mobile computing devices, identity information setting forth identities of other mobile computing devices reachable via a short-range wireless communication link;

accessing, by the electronic computing device, equipment mapping information that, for each of the plurality of mobile computing devices, sets forth equipment associated with one or both of a respective mobile computing device and a user of the respective mobile computing device;

identifying, by the electronic computing device, a plurality of pairs of the mobile computing devices for entering the incident scene area as a function of the identity information and the equipment mapping information; and for each identified pair of the mobile computing devices, transmitting, by the electronic computing device, a short-range pairing instruction to each mobile computing device in the identified pair identifying the other mobile computing device in the identified pair and instructing the mobile computing devices to pair with one another via their respective short-range wireless communication link.

2. The method of claim 1, wherein the equipment mapping information identifies mobile computing devices associated with users that are equipped with air tanks, and the step of identifying the plurality of pairs of mobile computing devices as a function of the identity information and the equipment mapping information enforces an incident scene pairing rule that each pair include at least one user equipped with an air tank.

3. The method of claim 1, wherein the equipment mapping information identifies mobile computing devices and/or associated users that are equipped with one of a heat sensor device, a visible light imaging device, and an infra-red imaging device, and the step of identifying the plurality of pairs of mobile computing devices as a function of the identity information and the equipment mapping information enforces an incident scene pairing rule that each pair include at least one user equipped with the one of the heat sensor device, the visible light imaging device, and the infra-red imaging device.

4. The method of claim 1, wherein the equipment mapping information identifies mobile computing devices and/or associated users that are equipped with one of a K-9 unit, a personal drone unit, and a tactical robotic unit, and the step of identifying the plurality of pairs of mobile computing devices as a function of the identity information and the equipment mapping information enforces an incident scene pairing rule that each pair include at least one user equipped with the one of the K-9 unit, the personal drone unit, and the tactical robotic unit.

5. The method of claim 1, further comprising monitoring each pair of mobile computing devices and, responsive to receiving an indication from one mobile computing device in a pair of mobile computing devices that the short range wireless communication link with the other mobile computing device in the pair has been lost, causing one of a visual and audible alert to be generated to an electronic computing device.

6. The method of claim 5, wherein the electronic computing device is a command central computing device disposed at the incident scene.

7. The method of claim 5, wherein the electronic computing device is a commanding officer's mobile computing device.

8. The method of claim 5, wherein the electronic computing device is an infrastructure computing dispatch console device.

9. The method of claim 1, further comprising detecting, by electronic computing device, an inability to transmit a message or notification to one mobile computing device of a particular one of the pairs of mobile computing devices, and responsively transmitting, by electronic computing device, the message or notification to the other mobile computing device in the particular pair of mobile computing devices accompanying an indication that the message or notification is intended for the one mobile computing device of the particular pair of mobile computing devices.

10. The method of claim 1, further comprising receiving, by electronic computing device, one of an emergency and evacuation notification from one mobile computing device of a particular one of the pairs of mobile computing devices, and responsively transmitting, by electronic computing device, the notification to the other mobile computing device in the particular pair of mobile computing devices accompanying an indication that the message or notification was generated from the one mobile computing device of the particular pair of mobile computing devices.

11. The method of claim 1, further comprising determining, by electronic computing device, that each mobile computing device in a particular one of the pairs of mobile computing devices has exited the incident scene, and responsively transmitting, by the electronic computing device, a short-range un-pairing instruction instructing each mobile computing device in the particular pair of mobile computing devices to remove the pairing via their respective short-range wireless communication link.

12. The method of claim 11, wherein determining that each mobile computing device in the particular one of the pairs of mobile computing devices has exited the incident scene comprises receiving, by the electronic computing device, location indications from each mobile computing device in the particular one of the pairs of mobile computing devices and determining, by electronic computing device, that the location indications fall outside of a geo-fence identifying the incident scene at the electronic computing device.

13. The method of claim 11, wherein determining that each mobile computing device in the particular one of the pairs of mobile computing devices has exited the incident scene comprises receiving, by the electronic computing device, an incident exited message from each mobile computing device in the particular one of the pairs of mobile computing devices.

14. The method of claim 1, wherein the incident area is an internal building structure, and wherein the receiving, accessing, identifying, and transmitting steps are all executed by the electronic computing device prior to the plurality of mobile computing devices entering the internal building structure.

15. The method of claim 1, wherein the equipment mapping information is pre-populated at the electronic computing device.

16. The method of claim 1, further comprising creating, by the electronic computing device, the equipment mapping information in response to receiving attached equipment information from each mobile computing device.

17. The method of claim 16, wherein the attached equipment information is received from each mobile computing device accompanying the identity information.

18. The method of claim 1, wherein the short-range wireless communication link is one of a Bluetooth (BT) link, a near-field communication (NFC) link, and an infrared data association (IrDA) link.

19. An electronic computing device for incident device pairing for improved safety and security of first responders entering an incident area associated with an incident, the electronic computing device comprising:
one or more wireless transceivers;
a data store; and
one or more processors configured to:
transmit, via the one or more wireless transceivers, a request to scan for nearby pairable mobile computing devices to each of a plurality of mobile computing devices associated with the incident;
receive, via the one or more wireless transceivers from each of the plurality of mobile computing devices, identity information setting forth identities of other mobile computing devices reachable via a short-range wireless communication link;
access, via the data store, equipment mapping information that, for each of the plurality of mobile computing devices, sets forth equipment associated with one or both of a respective mobile computing device and a user of the respective mobile computing device;
identify a plurality of pairs of the mobile computing devices for entering the incident scene area as a function of the identity information and the equipment mapping information; and
for each identified pair of the mobile computing devices, transmit via the one or more wireless transceivers, a short-range pairing instruction to each mobile computing device in the identified pair identifying the other mobile computing device in the identified pair and instructing the mobile computing devices to pair with one another via their respective short-range wireless communication link.

20. A non-transitory computer readable medium containing a set of instructions that, in response to execution by a processor of an electronic computing device, performs a set of functions comprising:
transmitting, by the electronic computing device, a request to scan for nearby pairable mobile computing devices to each of a plurality of mobile computing devices associated with the incident;
receiving, by the electronic computing device from each of the plurality of mobile computing devices, identity information setting forth identities of other mobile computing devices reachable via a short-range wireless communication link;
accessing, by the electronic computing device, equipment mapping information that, for each of the plurality of mobile computing devices, sets forth equipment associated with one or both of a respective mobile computing device and a user of the respective mobile computing device;
identifying, by the electronic computing device, a plurality of pairs of the mobile computing devices for entering the incident scene area as a function of the identity information and the equipment mapping information; and
for each identified pair of the mobile computing devices, transmitting, by the electronic computing device, a short-range pairing instruction to each mobile computing device in the identified pair of the other mobile computing device in the identified pair and instructing the mobile computing devices to pair with one another via their respective short-range wireless communication link.

* * * * *